3 Sheets—Sheet 1.

W. H. SMYTH.
Drag-Saw.

No. 212,278. Patented Feb. 11, 1879.

Witnesses:
Geo. H. Strong
Frank A. Brooks

Inventor:
William H. Smyth
By Dewey & Co.
attys.

3 Sheets—Sheet 2.

W. H. SMYTH.
Drag-Saw.

No. 212,278. Patented Feb. 11, 1879.

Witnesses:
Geo. H. Strong
Frank A. Brooks

Inventor:
Wm. H. Smyth
By Dewey & Co. att'ys

3 Sheets—Sheet 3.

W. H. SMYTH.
Drag Saw.

No. 212,278. Patented Feb. 11, 1879.

Witnesses:
Geo. H. Strong
Frank A. Brooks

Inventor:
William H. Smyth
By Dewey & Co
attys.

UNITED STATES PATENT OFFICE.

WILLIAM H. SMYTH, OF SAN FRANCISCO, CALIFORNIA.

IMPROVEMENT IN DRAG-SAWS.

Specification forming part of Letters Patent No. 212,278, dated February 11, 1879; application filed October 28, 1878.

*To all whom it may concern:*

Be it known that I, WILLIAM HENRY SMYTH, of the city and county of San Francisco, and State of California, have invented a Drag-Saw or Portable Sawing-Machine and Tree-Feller; and I hereby declare the following to be a full, clear, and exact description thereof, reference being had to the accompanying drawings.

My invention relates to certain improvements in that class of apparatus known as "portable sawing-machines or tree-fellers," said machines being intended to cut down trees and to reduce the felled logs to convenient lengths for any purpose which may be desired.

My improvements consist in the employment of a reciprocating saw which has a connecting-rod uniting it with a cross-head moving upon or between suitable guides. These guides are loosely united at their rear ends with the driving-axle, so that they move about it as a center as the saw makes its cut. The driving-crank is formed in this axle between the guides, and is connected with the cross-head by a connecting rod or pitman. In combination with this device I employ a novel feeding apparatus, which operates to feed the saw forward into the cut at each revolution of the crank and reciprocation of the saw. The whole is mounted upon a frame and provided with holding-clamps, so that it may be easily attached to the tree or log in any desired position, to cut either vertically or horizontally, and the mechanism will be adjustably connected with the driving power, so as to be moved from one tree or point to another without disturbing the power, as will be more completely described by reference to the accompanying drawings, in which—

Figure 1:
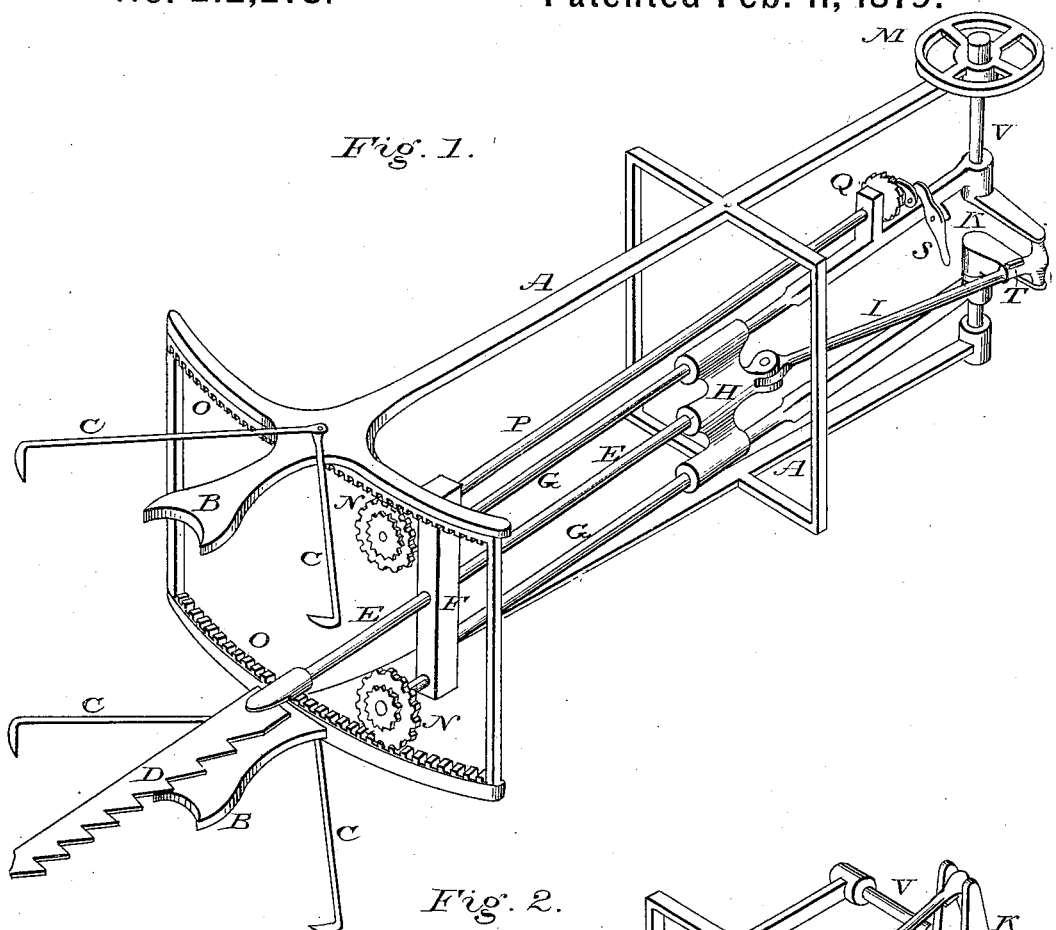
Figure 2:
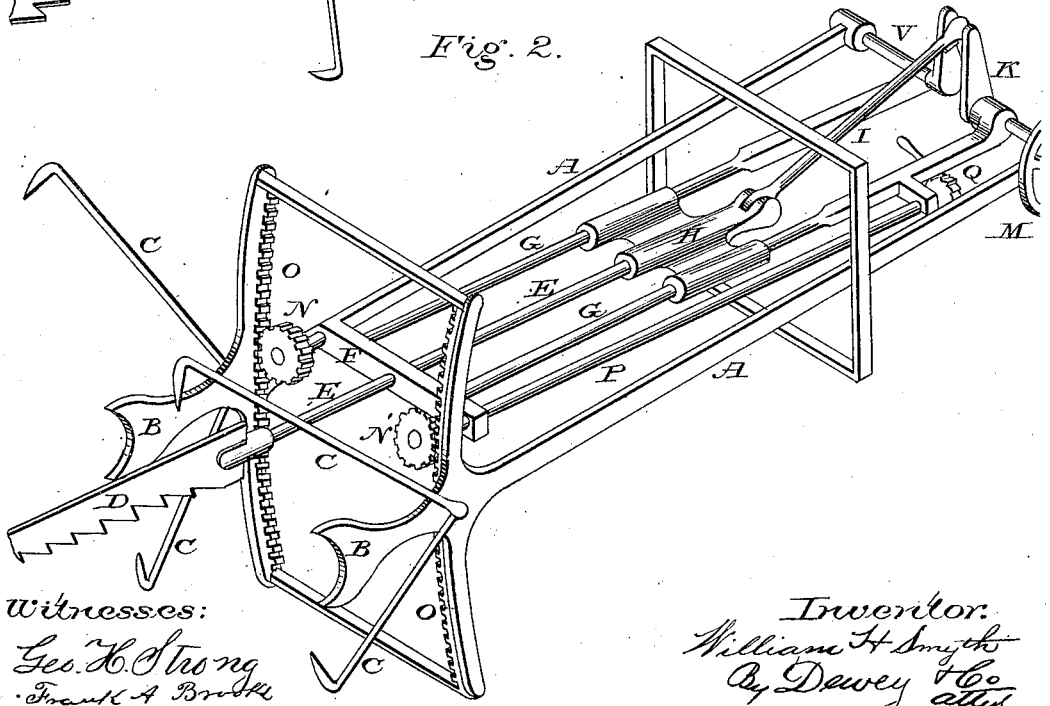
Figure 2:
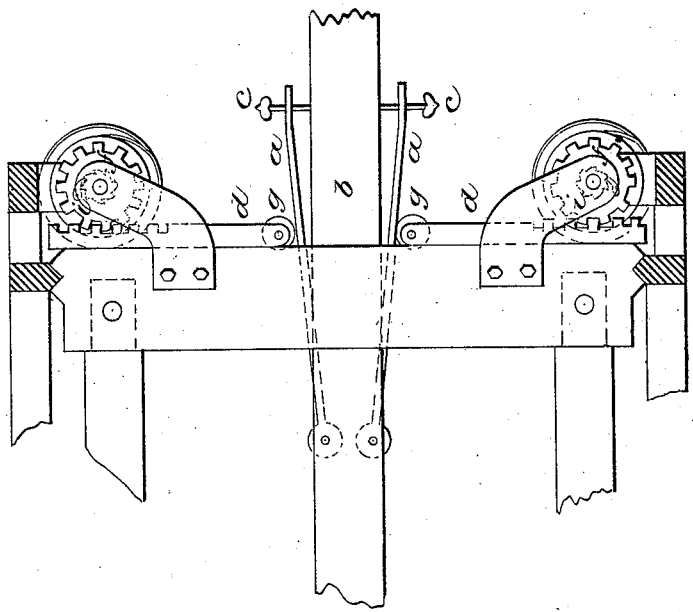
Figure 1:
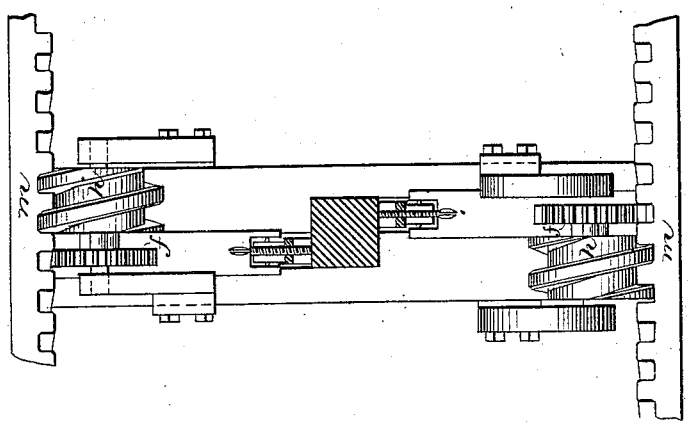
Figure 3:
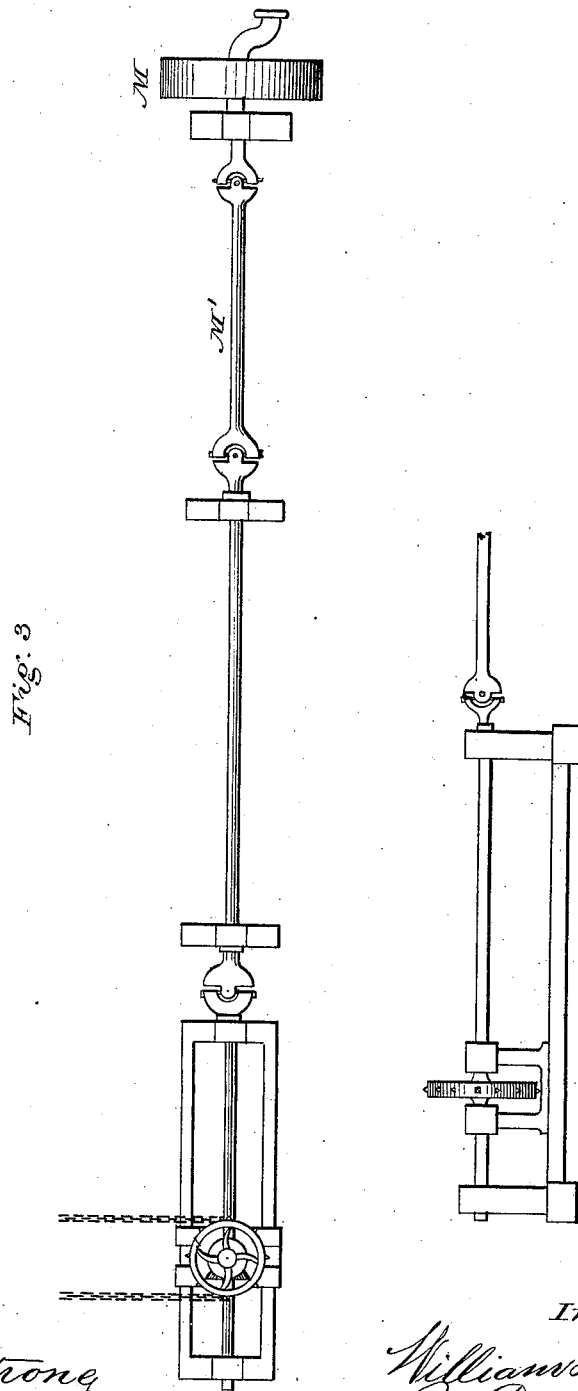

Figure 1 is a view of my apparatus. Fig. 2 is a section showing the feed mechanism. Fig. 3 shows the tumbling-rods and pulley. Figs. 1' and 2' are details.

Let A represent a suitably-constructed frame, in which the operating mechanism is mounted. At the outer end of this frame are formed the jaws or steadying-forks B, which are intended to hold the frame steady by being pushed firmly against the tree or log. On the sides of the frame are pivoted the dog-arms C, one long and one short one on each side, so that after the frame or carriage is in position the dogs are driven into the wood and hold the frame firmly in place. The log or tree is then grasped, as it were, by the dog-arms, so that there is no motion to the frame or carriage as the saw is operated. When the apparatus is to be used upon fallen logs the short arms or dogs will be secured below, being made short, so as to be easily secured in this position; but it will be seen that the apparatus may be easily secured at any angle in which the log lies.

The saw is secured on the end of the connecting-rod E, which rod passes through the bar F, connecting the guides G, hereinafter described, and is attached to the cross-head H, as shown. The pitman I, connecting the cross-head with the driving-shaft V, is journaled to the driving-crank K, which is formed on said driving-shaft V at its center, as shown. On the outer end of this driving-shaft is the driving-wheel M, by which power is applied. As this wheel M is rotated, the pitman operates the cross-head on the guides, and a reciprocating motion is given to the saw.

In order to insure an automatic feed to the saw, the rear ends of the guides G are hinged or journaled onto the driving-axle, one on each side of the pitman-crank K, so that the guides may move about said shaft as a center as the saw makes its cut. These guides are connected at their front ends by the bar F, said bar extending each way from the guides, and having connected with it the gear-wheels N N', which mesh with the curved rack-bars O, secured on the frame, as shown.

The gear-wheel on one side is secured to the rod P, said rod extending back and being journaled on the guide, so as to have the same motion about the center of the driving-shaft as the guides have. At the rear end of said rod P is a ratchet-wheel, Q, and a pawl on the end of a trip bar or lever, S, engages with this ratchet. On the rear end of the pitman is a lug, T, which, at each revolution of the crank-shaft, engages with the end of the trip bar or lever S, thus turning the ratchet-wheel Q by means of the pawl. As the rod P is rotated by the ratchet-wheel Q, the outer gear-wheel, N, is rotated, and by engaging with the curved rack-bar moves the guides and saw, so as to give the required feed to the saw at each revolution of the crank and reciprocation of the saw.

The frame may be adjusted to a standing tree or fallen log, so that the tree may be felled and afterward cut up into suitable lengths.

It will be seen that the feeding mechanism is adjustably connected with the driving power, so as to be moved from one place to another without disturbing the power, and that the rack-bars may be of any suitable length, so that the saw will be fed through a log of any thickness.

The power will be applied preferably by means of a chain or belt passing over the pulley M from the power-wheels. The power may be derived from an engine, horse, or other convenient source, and may be connected over uneven ground by tumbling-rods M' to the driving-shaft. This shaft is mounted upon a frame, as shown in Fig. 3, and the driving-chain pulley is driven from this shaft by a bevel-gear. The pulley and gearing are mounted in a supplemental frame, and as the main gear slides on a feather, the whole device may be moved from one end to the other of the main frame, thus allowing the machine proper to be shifted while the belt-wheels are always in line.

This device furnishes power to fell standing trees; but in sawing fallen logs the pulley goes directly upon the horizontal shaft.

Having thus described my invention, what I claim as new, and desire to secure by Letters Patent, is—

1. The saw D, rod E, cross-head H, pitman I, and crank K, in combination with guide-rods G, journaled on crank-shaft V, substantially as described.

2. The saw D, with the guides and cross-head journaled to move about the operating crank-shaft, in combination with the feeding device, consisting of the racks O, gears N N', shaft P, the pawl and ratchet Q, and the operating-lever S, so fitted as to be moved at each revolution of the crank, substantially as and for the purpose herein described.

3. An adjustable sawing device consisting of the saw supporting and directing guides and cross-head journaled to move about the driving crank-axle V, which turns in boxes at one end of a frame, A, said frame being provided with the steadying-forks B and holding-dogs C, whereby the machine may be set at any angle, and an antomatic feeding device by which to feed the saw forward, substantially as herein described.

In witness whereof I have hereunto set my hand.

WILLIAM HENRY SMYTH.

Witnesses:
  GEO. H. STRONG,
  FRANK A. BROOKS.